A. H. DARKER.
BEARING FOR DYNAMO ELECTRIC MACHINES.
APPLICATION FILED MAY 15, 1916.
1,256,777.
Patented Feb. 19, 1918.
2 SHEETS—SHEET 1.
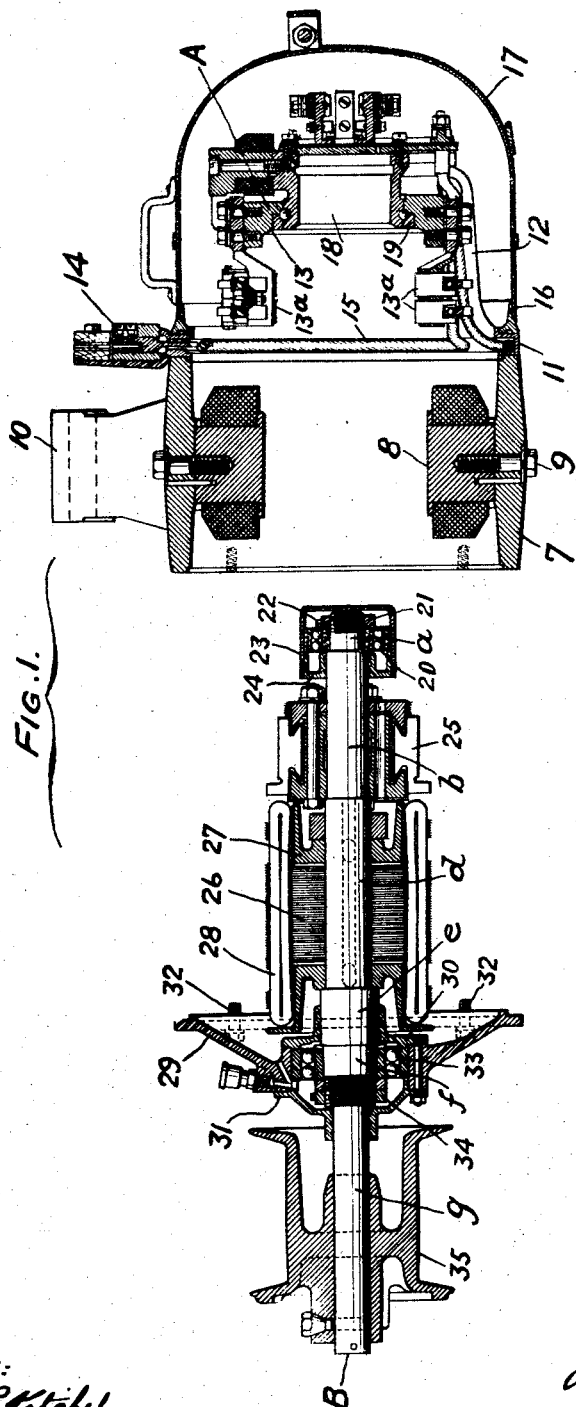

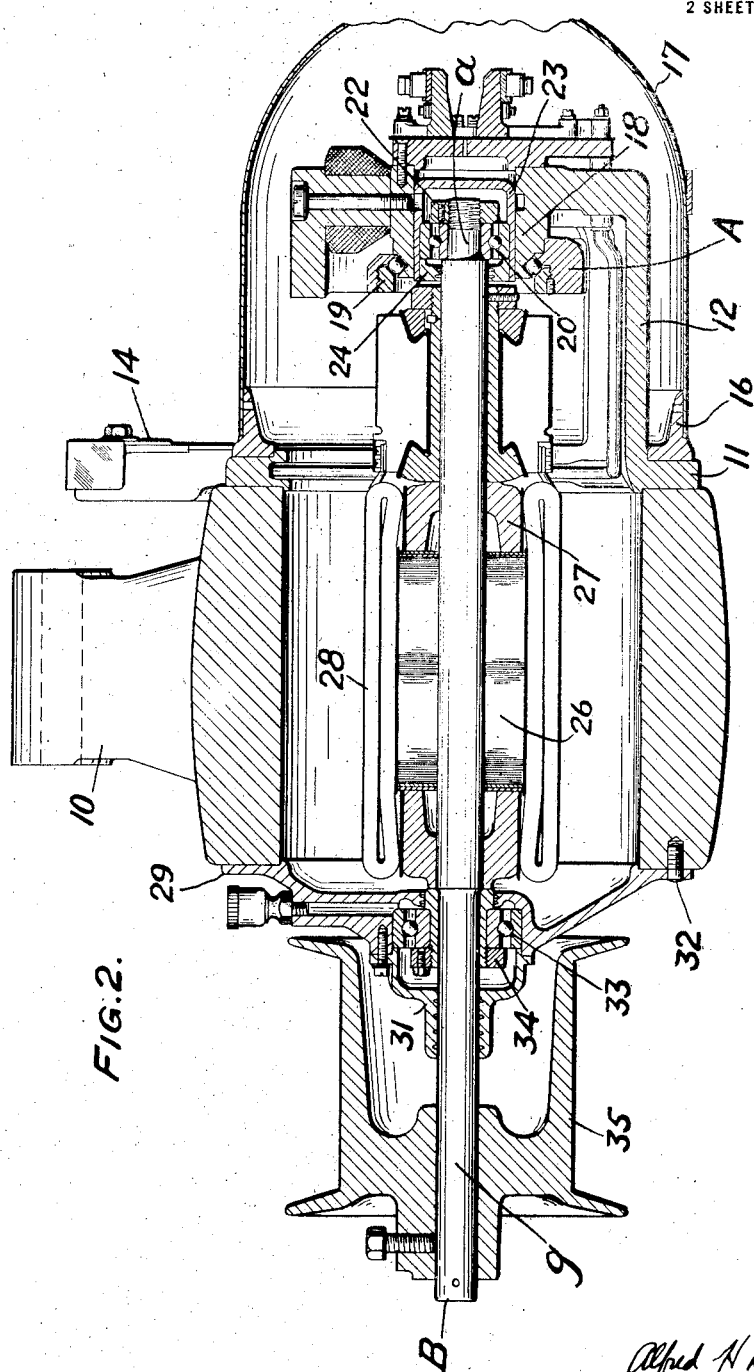

UNITED STATES PATENT OFFICE.

ALFRED HENRY DARKER, OF BLACKHEATH, ENGLAND, ASSIGNOR TO J. STONE & COMPANY, LIMITED, OF LONDON, ENGLAND.

BEARING FOR DYNAMO-ELECTRIC MACHINES.

1,256,777.   Specification of Letters Patent.   Patented Feb. 19, 1918.

Application filed May 15, 1916. Serial No. 97,655.

*To all whom it may concern:*

Be it known that I, ALFRED HENRY DARKER, a subject of the King of Great Britain, residing in Blackheath, county of Kent, England, have invented certain new and useful Improvements in Bearings for Dynamo-Electric Machines, of which the following is a specification.

This invention relates to dynamo bearings particularly for that type of dynamos used in electric train lighting and heating systems such as are employed, for example, in railway service. It has for one of its primary objects the provision of an improved construction and arrangement of dynamo whereby the dynamo may be readily assembled and quickly taken apart for purposes of examination or repair, and as quickly reassembled, either on the road or in the shops. Another object of my invention is to so construct and arrange the dynamo that the armature shaft bearings may be quickly removed and replaced with the shaft. In general my invention contemplates a simplified and effective arrangement of the dynamo parts to secure the advantages hereinafter to be set forth.

The foregoing, together with such other objects as may hereinafter appear or are incident to my invention I attain by means of a construction which I have illustrated in preferred form in the accompanying drawings wherein—

Figure 1 is a cross section through my improved dynamo showing the parts in position to be assembled; and Fig. 2 is a section on a modified form of dynamo with the parts in assembled relation.

Referring now to Fig. 1, the field yoke or ring 7 carries the poles 8 in the usual manner, such poles being secured in position by means of the studs 9. The yoke 7 is provided with a supporting bracket 10 which, in the present instance, is pivotally supported from the car frame. Secured to one face of the yoke 7 by means of studs (not shown) is an end plate or frame 11 having integrally formed therewith an arm or arms 12 and a bearing or collar ring 18 in which is revolubly mounted a ring or collar 13 carrying a reversing switch gear and brush holder rocker A such as that shown, for example, in Letters Patent of the United States issued to me March 16, 1915, No. 1,131,914. The brushes are indicated at 13ª. The frame 11 is provided with the terminal box 14 from which the leads 15 extend. An annular flange or ring 16 is adapted to seat in the outer face of the frame 11 and serves as a means for detachably mounting the removable dust cap or hood 17 on said frame, which dust cap may be readily removed to expose the switch mechanism. Switch contact parts are supported from the ring 18 and between the rings 13 and 18 there is an annular ball bearing device 19.

The armature parts are shown to the left of Fig. 1 and will now be described. The armature shaft B is provided at one end with a short reduced portion $a$ which carries the ball race parts or bearing 20, the inner ring of such race being held against the adjacent portion $b$ of the shaft which is larger in diameter than the portion $a$, by means of the threaded washer 21, which is locked in position by the screw 22. The bearing cage 23 which is adapted to seat within the ring 18 is supported on the outer ring of the ball race and is closed by means of the plate 24 which also serves to retain the lubricant. The commutator 25 is mounted on the portion $b$ of the armature core 26, armature frame 27 and armature windings 28 are mounted on the portion $d$ of the armature shaft which is of larger diameter than the portion $b$. The end plate 29 of the dynamo is carried on two collars 30 and 31, and it is secured to the yoke 7 by means of the studs 32. The collar 30 is carried on the portion $e$ of the armature shaft, such portion being of larger diameter than the portion $d$, and mounted between the collars 30 and 31 is a second bearing or ball race 33, the inner ring of which is mounted on the portion $f$ of the shaft, which portion is of smaller diameter than the portion $e$, said inner ring being positioned by means of the threaded lock washers 34. The collar 31 is supported on the reduced portion $g$ of the armature shaft, on which portion is also keyed a pulley 35 by means of which the armature is turned from the axle of the car by means of a belt (not shown). The collars 30 and 31 also serve to retain the lubricant for the bearing inclosed therein.

It will be seen from the foregoing that all of the armature parts, inclusive of the armature proper, the commutator, the bearings for the armature shaft, the end plate of the dynamo, and the driving pulley, are mounted upon the armature shaft B so as to be capable of insertion into and withdrawal from the yoke 7 as an entirety. It will also be noted that the armature shaft is so constructed that the parts enumerated can be readily assembled thereon. When the armature shaft and its associated parts are placed in position in the yoke 7, the end armature shaft bearing is supported in the ring or collar 18, and the other bearing adjacent to the pulley is supported from the yoke through the medium of the end plate 29. It will also be noted that the switch parts, contacts, the leads, etc., are readily accessible when the dust cap or cover is removed.

Among the chief advantages of this improved construction is that all parts of the dynamo are accessible for immediate examination or repair, and this can be done in the space of a few moments, thus making it possible for examination and repairs to be made while the car is in service within the time available during stops. It is also advantageous to support the armature shaft bearings so that they may be inserted and removed with the shaft.

In Fig. 2 I have shown a slightly modified form of construction which, however, is in general substantially the same as that previously described, there being minor differences in the shape and conformation of the armature shaft and the bearings. The two constructions, however, have the common characteristic that the armature shaft may be removed together with all of its associated parts and particularly the shaft bearings, as an entirety from one end of the yoke, while the switch parts, contacts, and the leads, etc., are readily accessible and also removable from the opposite end.

I claim:

1. A device of the class described comprising a casing having an open end, a rotary member adapted to be mounted therein, a pair of bearings mounted on the rotary member and removable therewith, a bearing socket in said casing in which one of said bearings is supported for free insertion and removal, a bracket mounted on the other bearing, and means for securing the bracket to the casing.

2. A device of the class described comprising a casing, a rotary member adapted to be mounted therein for removal therefrom, a pair of bearings mounted on the rotary member for removal therewith, a bearing socket supported from one end of said casing in which one of said bearings is supported for free insertion and removal, a bracket mounted on the other bearing, and means for securing said bracket to the other end of the casing.

3. A device of the class described comprising in combination a casing having an open end, a rotary member adapted to be mounted therein, a ball bearing mounted at one end of said rotary member, a cage for said bearing having means for positioning the cage with reference to the ball bearing, a bearing socket in said casing in which said cage is supported for free insertion and removal, a bearing at the other end of said rotary member, a bracket mounted on said second bearing, and means for securing the bracket to the casing, said bearings being mounted on the rotary member for removal therewith.

4. A device of the class described comprising a casing having an open end, a rotary member adapted to be mounted therein, a bearing mounted on the rotary member adjacent one end thereof, a bearing socket in said casing in which said bearing is supported for free insertion and removal, a ball bearing adjacent to the other end of said rotary member, a combined cage and bracket relatively fixed with reference to said ball bearing, and means for securing the bracket to the casing, said bearings being removable with the rotary member.

In testimony whereof I have hereunto signed my name and affixed my seal.

ALFRED HENRY DARKER. [L. S.]